United States Patent Office 3,247,100
Patented Apr. 19, 1966

3,247,100
CONTROLLING INVENTORY CATALYST
ACTIVITY IN MOVING BED SYSTEMS
James H. Haddad, Fort Lee, N.J., assignor to Socony
Mobil Oil Company, Inc., a corporation of New York
Filed May 3, 1962, Ser. No. 192,185
2 Claims. (Cl. 208—165)

The invention relates to the control of catalyst activity in moving bed systems and particularly relates to the control of catalytic cracking activity of catalyst highly resistant to abrasion in moving bed catalytic cracking systems used to produce gasoline and fuel oil from heavier petroleum products.

Various processes have used the moving bed technique wherein a granular particle form material is passed as a gravitating mass through a contacting or reaction zone. The gas or vapor is passed through the void spaces in the bed and through the pores of the catalyst to effect the desired contacting. Reforming, cracking and coking are three such processes. This invention, however, will be disclosed with particular reference to moving bed cracking. In this process a granular cracking catalyst is passed as a compact gravitating mass through reaction and regeneration zones. A hydrocarbon vapor (introduced as partially liquid if desired) is passed through the reaction zone and the hydrocarobns are cracked to produce lighter, more desirable products and coke. The spent catalyst containing the coke is passed downwardly as a compact gravitating mass through a regeneration zone or kiln and air is passed through the catalyst bed to burn the coke and reheat and restore the catalyst activity. The regenerated catalyst is returned to the reaction zone to complete the enclosed cyclic path.

The reaction zone is generally maintained at a temperature of about 800–1100° F. and at a pressure of about 10–20 p.s.i. (gauge). The kiln is generally maintained at a temperature of about 875–1450° F. The catalyst is a natural or acid-treated clay or a synthetic silica, alumina, zirconia or combination material having catalytic cracking activity. The catalyst size may range about 3–60 mesh Tyler, being generally of the order of 4–12 mesh Tyler. A certain amount of wearing away or attrition of the catalyst occurs producing very small particles called fines. These fines plug the void spaces in the bed and generally interrupt operation so that they must be removed continuously and replaced by fresh catalyst. Since this replacement is expensive, efforts are continuously being made to reduce the attrition and thereby reduce this expense.

Recently, harder, more durable and heavier catalyst particles have been developed and have largely replaced the softer synthetic or natural clay catalyst in moving bed cracking systems. Such catalyst are disclosed in detail in U.S. Patent No. 2,900,349 and elsewhere. These catalyst particles are so attrition resistant that they remain in the system for very periods of time, going through innumerable cycles. Unfortunately, it has been found that as this catalyst ages in the system, its catalytic activity changes so that it no longer produces the maximum amount of useful product. The efficiency of the catalyst drops and less gasoline, a more desirable product, is produced. Catalyst efficiency is indicated by a measured quality of the catalyst known as catalyst activity. This measurement of catalyst activity is made by a well-known standard test called CAT-A whereby a standard gas oil is passed over a fixed bed of the catalyst under standard conditions and the portion converted into gasoline is the activity of the catalyst. If 30 percent of the gas oil is converted to gasoline, the catalyst activity is 30. The affect of this property on the performance or efficiency of the catalyst in a particular cracking plant is usually well known.

Where the catalyst activity is too low, insufficient gasoline is produced. The major causes of loss of activity or deactivation may include heat damage in the regeneration vessel, poisoning due to metals which are deposited on the catalyst from the oil charged to the reaction vessel, and deterioration due to contact with steam throughout the catalyst circulation cycle. The catalyst inventory generally reaches an equilibrium activity due to the balance between the above aging factors and the ameliorating effect of fresh high-activity catalyst which must be added to the unit to make up for the continuous wearing away of the catalyst particles. It is standard practice in the industry to check periodically the activity of the catalyst in the unit and maintain a continuous record of it. It is also standard practice to find the cause for any abnormal activity decline, and to eliminate any such cause or take other remedial action.

Normally the catalyst inventory in a moving bed cracking system will equilibrate in the activity range about 28–31, this being considered a satisfactory range for the production of the desired products. The commercial cracking units have sufficient flexibility in the controllable operating variables such as heat input, catalyst volume, oil recycle rate, catalyst and steam rates, etc., to adjust the severity of the cracking operation to give the desired distribution of products when the catalyst activity is in the above indicated range. If the catalyst activity falls below about 27–28, the maintenance of the desired product distribution will be difficult, expensive or impossible. When the catalyst activity rises above about 31–32, the amount of gas formed at the expense of more desirable product may be excessive and the cracking efficiency of the unit may be thereby impaired.

Unfortunately, with the durable attrition-resistant catalysts used today, the activity often drops below about 27–28. This is true even in the absence of deactivation due to metals contamination or heat damage, and is due solely to damage from contacts with steam throughout the circulation system. The activity of the catalyst can be corrected by removal of large amounts of the catalyst inventory and replacement thereof with new catalyst. This is an exceedingly expensive method of correction.

This invention relates to the controlling of the catalyst activity during operation of a moving bed cracking unit to maintain the catalyst activity within the desired operating range. Steam is used in various parts of the catalyst circulation system. For example, steam is used to seal the top of the hydrocarbon reaction vessel from the atmosphere. Steam is used as an inert to seal the bottom of the hydrocarbon reaction vessel from the catalyst regeneration vessel. It is added with the charge to the reaction vessel as an operating variable and it is added at the bottom of the reaction vessel as a purge medium to eliminate residual hydrocarbons from the spent catalyst particles before they leave the reaction vessel and enter the catalyst regeneration vessel. There is also a partial steam atmosphere in the catalyst regeneration vessel, due to the combustion of the hydrocarbon coke in this vessel, and to the water vapor content of the ambient combustion air. It is known that the rate and severity of steam aging of cracking catalyst increases with the time of contact, the steam partial pressure of the contact, and the temperature of the contact.

I have found that the catalyst equilibrium activity is lowered considerably as the temperature of the catalyst entering the reaction vessel is increased and to a lesser extent as the pressure in the reactor is increased. Unfortunately, from a catalyst activity viewpoint, it is the current tendency in the industry to employ higher catalyst temperatures entering the reactor and to increase the pressure in the reactor.

I have also found that the equilibrium activity of the catalyst inventory can be controlled over a wide range by controlling the partial pressure of the steam in contact with the catalyst as it passes through the gravity feed pipe into the top of the reactor, and through the catalyst distribution system in the top of the reactor. In the past, 100% steam has been used at these locations to serve as an inert gas to seal the hydrocarbon reaction vessel from the atmosphere. The range over which the equilibrium activity of the catalyst can be controlled is a function of the dimensions of the gravity feed pipe and the distribution system in the top of the reactor, the catalyst inventory, the catalyst temperature, the operating pressure, the catalyst make-up rate, and the activiy index of the make-up catalyst. When the steam partial pressure in both the gravity feed pipe, hereinafter termed the seal leg, and in the region between the base of the seal leg and the base of the catalyst distribution system in the top of the reactor, hereinafter termed the top seal, are both controlled, the equilibrium activity of the system inventory can be controlled over a large range of activity levels. I discovered that when the catalyst is contacted with flue gas at these locations the catalyst equilibrium activity is relatively high, and when contacted with steam, is relatively low. The catalyst activity index or number can be controlled with a variable mixture of steam and flue gas to maintain the activity of the catalyst at the most efficient level regardless of how long or short a period the catalyst is retained in the system and regardless of the catalyst temperature and pressure at these locations. It is also possible to control the activity level of the catalyst by controlling the partial pressure of the steam in the seal leg and in the top seal separately.

The object of this invention is to provide a means and method for operating a moving bed conversion system to maintain the cracking activity of the catalyst within the most efficient operating range.

A further object of this invention is to provide a means and method for operating a moving bed cracking system at a substantially fixed catalyst cracking activity regardless of the durability of the catalyst used.

A further object of this invention is to provide a means and method for maintaining a TCC system in operation at a fixed catalyst activity level while varying the fresh catalyst replacement rate to maintain a minimum fines content in the system.

A further object of this invention is to provide a means and method of adjusting the activity level of the catalyst in a TCC system and thus using it as a controlled operating variable.

These and other objects will be more fully disclosed in the following detailed description of the invention which is to be read in conjunction with the attached figures.

Figure 1:
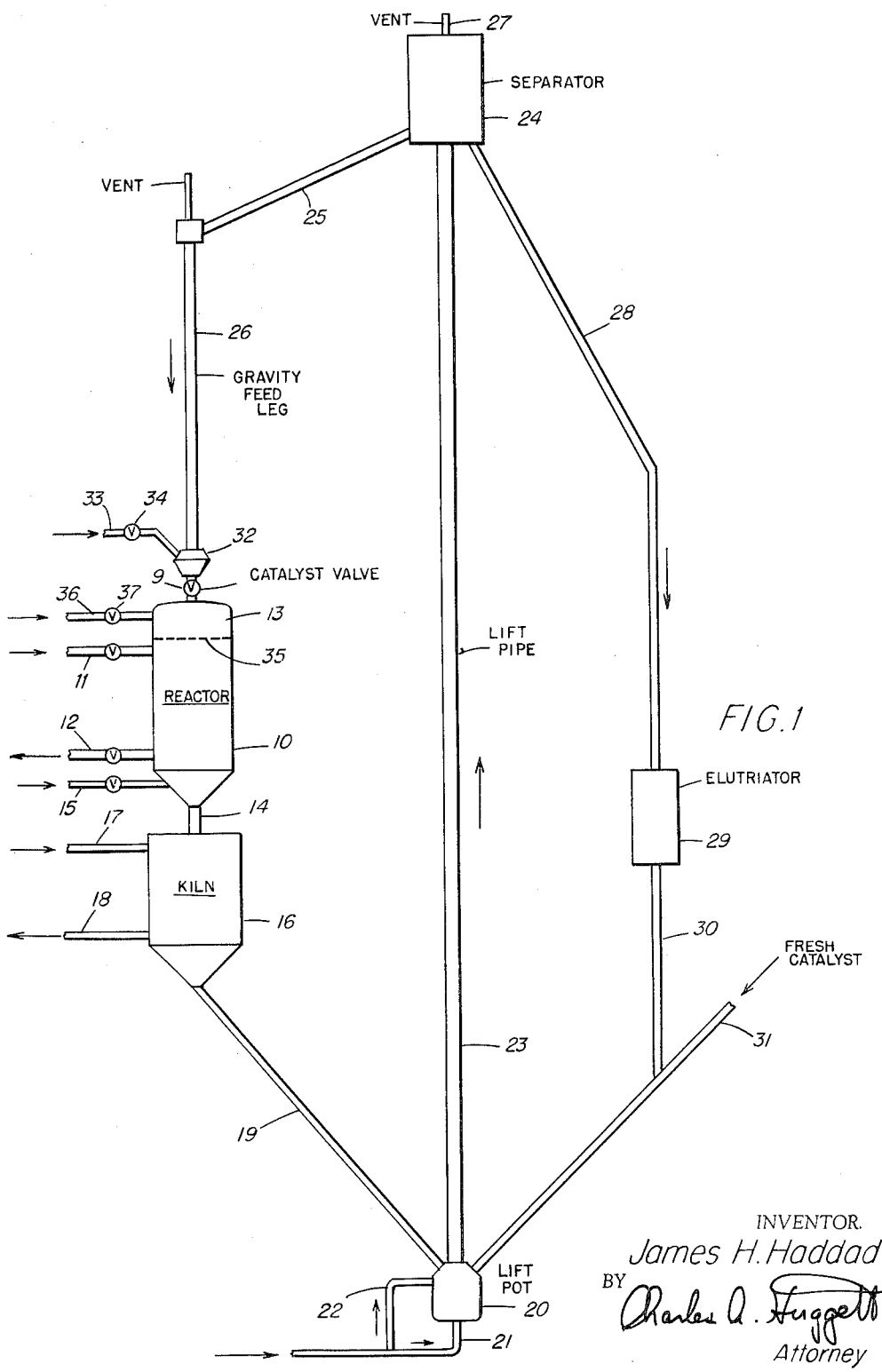
FIGURE 1 shows diagrammatically a moving bed conversion system.

Referring now to FIGURE 1, a complete TCC system is shown schematically. The granular catalyst is gravitated as a compact mass through the reactor 10. The hydrocarbons, suitably prepared for treatment, are introduced through the conduit 11 and withdrawn from the conduit 12. The upper section 13 of the reactor 10 provides for the distribution of the catalyst across the vessel 10. The reactor 10 is maintained at about 10–20 p.s.i. (gauge) pressure and at about 800–1100° F. temperature. The catalyst is withdrawn from the bottom of the reactor 10 through the conduit 14. A seal gas, such as steam, is introduced into the bottom of the reactor 10 through the conduit 15 to prevent the reactants from escaping downwardly with the catalyst and to purge residual hydrocarbons from the catalyst before it enters conduit 14. The catalyst valve 9 located at the base of the gravity feed leg is an emergency valve which is normally kept open but which closes automatically in the event that some danger occurs in the system which would tend to blow reactant hydrocarbons up through the feed leg to the atmosphere.

The spent catalyst withdrawn from the reactor is introduced into the kiln 16 and gravitated downwardly in the form of a compact gravitating mass. Air is introduced into the kiln 16 through the conduit 17 and discharged from the kiln through the conduit 18. The kiln pressure is maintained at essentially atmospheric pressure and the kiln temperature is maintained at about 900–1450° F. Excessive temperature heat damages the catalyst causing it to be less effective as a catalyst. If the temperature is too low the carbon removal is inadequate. The regenerated catalyst is passed through the conduit 19 to the lift pot 20.

A lift gas is introduced into the lift pot 20 through the conduits 21, 22 to elevate the catalyst in dilute phase through the lift pipe 23 to a lift separator 24 which is maintained at a pressure of 0 to 0.1 p.s.i. (gauge). The separated catalyst in the separator 24 is graviated through the conduit 25 and gravity feed leg 26 into the reactor 10. The lift gas is discharged from the vent 27. A small portion of the catalyst from the separator 24 is passed through the conduit 28 to the elutriator 29. The fine particles are removed in the elutriator and the fines-free granular material is passed through the conduit 30 into the lift pot 20. Fresh catalyst is introduced into the system from time to time through the conduit 31.

The gravity feed leg 26 is made long enough to permit the catalyst to feed smoothly into the reactor 10 against the advanced pressure existing therein. Since about 3–4 feet of feed leg is required for each pound of pressure differential, a reactor pressure of 15 p.s.i. (gauge) will require about 60 feet of feed leg height to provide adequate feeding head. A seal pot 32 is located near the bottom of the feed leg 26 and flue gas or stream can be introduced into the seal pot 32 through the conduit 33. Valve 34 permits the flow of seal gas to be regulated. A catalyst plug valve 9 is located below seal pot 32 to enable isolating the reactor from the atmosphere in the event the catalyst flow in the gravity feed leg is interrupted. A distributor sheet 35 is located across the vessel 10 providing top zone 13 from which the catalyst is distributed over the cross-sectioned area of the reactor.

Three methods of sealing the hydrocarbon reactants in the reactor from the atmosphere, and at the same time providing a control over activity of the catalyst by controlling the partial pressure of the steam in contact with the catalyst as it flows from the separator 24 at 0 p.s.i. (gauge) into the reactor 13 at about 15–20 p.s.i. (gauge), are shown on the attached FIGURES 2, 3 and 4.

Figure 2:
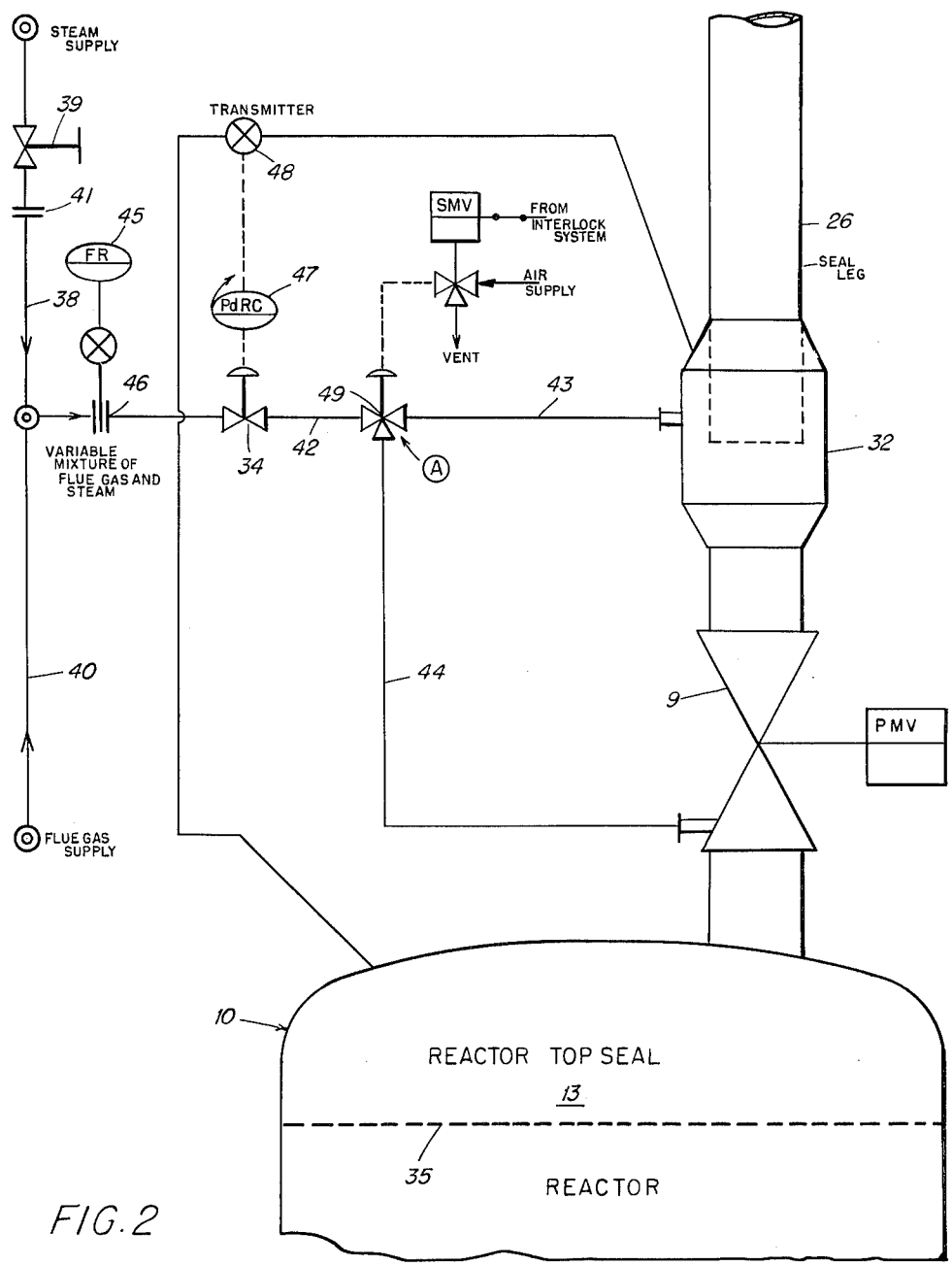
FIGURE 2 shows in detail an apparatus combination adapted for practicing the invention.

Referring now to FIGURE 2, the apparatus for sealing the top of the reactor 10 is shown in highly diagrammatic form. Steam is supplied through conduit 38 controlled by valve 39 and measured by orifice type flow indicator 41, and flue gas is supplied through conduit 40. The variable mixture of steam and flue gas is then transmitted through conduits 42 and 43 to the seal pot 32. The total flow of the variable mixture of steam and flue gas is measured and recorded by means of orifice 46 and flow recorder 45. The pressure differential recorder controller 47 is operated by transmitter 48 to maintain a fixed pressure differential between the seal pot 32 and the reactor top 13 by operating on valve 34 in line 42. The pressure differential recorder controller 47 maintains the pressure in the seal pot 32 at about 0.5 p.s.i. (gauge) higher than in the reactor top 13, by operating valve 34 which regulates the total flow of seal gas. The three-way valve 49 is an emergency measure; in the event the catalyst valve 9 is closed by the interlock system, which operates when emergencies arise to isolate portions of the system, the seal gas flow switches from entering the seal pot 32 to entering the body of the plug valve 9. The catalyst activity is controlled by controlling the composition of the seal medium, steam, flue gas or a mixture of the two.

Figure 3:
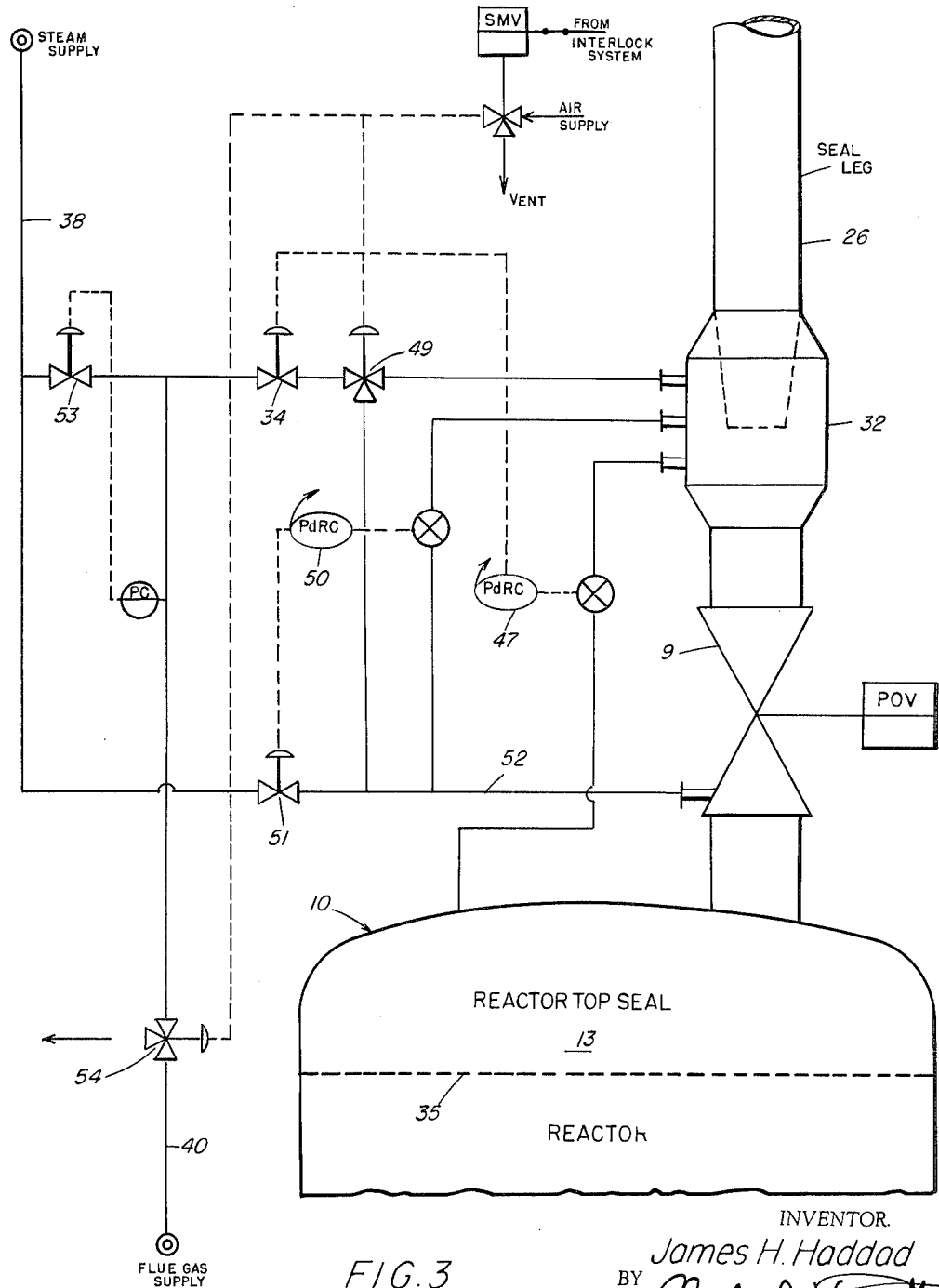
FIGURE 3 shows in detail an alternate embodiment of the invention.

Referring now to FIGURE 3, the gas in the seal leg is normally all flue gas, and a variable mixture of steam and flue gas is admitted to the top of the reactor to provide the desired catalyst activity adjustment. The valve 34 is automatically controlled by the pressure differential recorder controller 47 to maintain a constant pressure differential (about 0.5 p.s.i.) between the seal pot 32 and the reactor top section 13. Valve 53 is normally in the closed position activated by the pressure controller from the flue gas line 40. The pressure differential recorder controller 50 between pot 32 and a location below the plug in valve 9 is used to control valve 51 in the conduit 52, thereby providing a controllable amount of steam to the top of the reactor 10. This differential can be set at a high positive differential (pressure in pot 32 greater than below valve 9), so that no steam will flow through valve 51 and flue gas will flow downward from pot 32, thereby providing 100% flue gas in the top seal. This causes maximum increase in catalyst activity. At zero differential pressure the gas in the top seal will be 50% steam. At high enough negative differentials the gas in the top seal will be all steam and give lowest activity. Valve 53 is installed as a safety precaution. In the event the flue gas supply is lost, the valve 53 will open automatically and steam will be available for sealing the system. Three-way valve 49 operates as in FIGURE 2. When valve 49 is activated in an emergency, valve 54 will shut off the flue gas supply, valve 53 will open to supply steam, and valve 51 will close.

Figure 4:
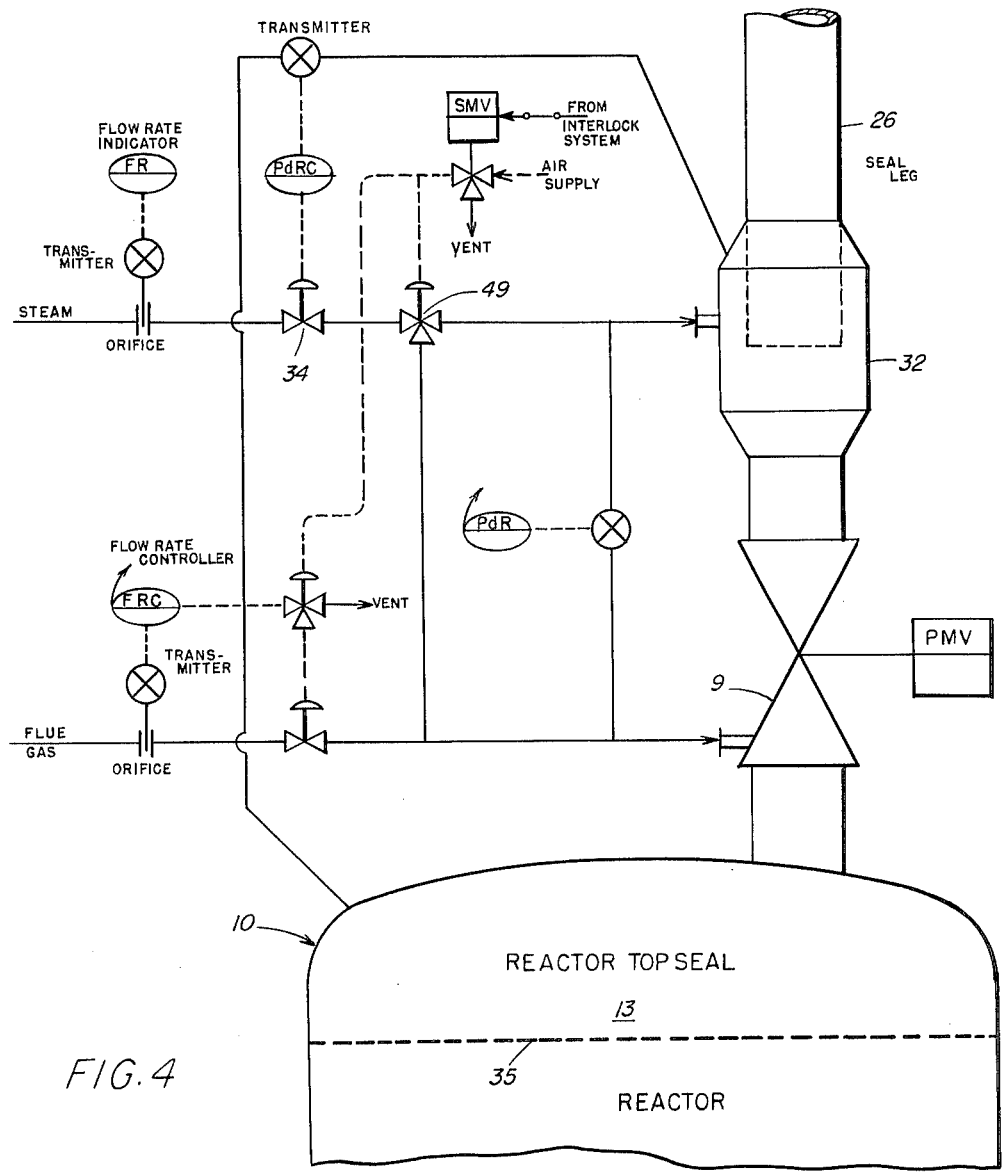
FIGURE 4 shows in detail a further embodiment of the invention.

Referring now to FIGURE 4 an alternate embodiment of the invention is shown. In this case the gas in the seal leg is normally all steam, and the rate is controlled using the conventional system shown in FIGURE 2. Catalyst activity is controlled by controlling the composition of the gas in the top seal—all steam can be used, all flue gas or a variable mixture of the two. Catalyst activity is highest when all flue gas is used, and lowest when all steam is used. At this instance, control of the composition is obtained by hand and the indicated differential pressure between seal pot 32 and the bottom of the plug valve 9 is a measure of the composition of the gas in the top seal. For example, when the flue gas is shut off the differential pressure will be positive (pressure in pot 32 is greater than the pressure at the base of plug valve 9) and at its maximum and the gas in the top seal will be 100% steam, flowing down from pot 32 above. As the flue gas valve is opened less steam will come down and at zero differential the gas composition will be 50% steam and 50% flue gas. With negative differential pressures 100% flue gas can be approached. The three-way valve 49 serves the same purpose disclosed in the other embodiments. In this instance, natural gas or refinery gas may be substituted for the flue gas.

EXAMPLE I

The invention is illustrated by its application to a moving bed TCC unit similar to that shown on FIGURE 1 and by the use of the embodiment shown more specifically on FIGURE 2. The plant was designed to handle 24,000 bbl.'s per day of charge oil. The plant had the following characteristics:

Catalyst volume in reactor seal leg, cu. ft. _____ 213
Catalyst volume in top seal, cu. ft. _____ 169
Catalyst volume in entire unit, cu. ft. _____ 19,682
Reactor top pressure, p.s.i. (gauge) _____ 15
Partial pressure of steam in:
    Reactor bed, atmosphere _____ 0.45
    Reactor purge, atmosphere _____ 1.63
    Piping reactor to kiln, atmosphere _____ 1.3
    Kiln top bed, atmosphere _____ 0.12
    Kiln lower bed, atmosphere _____ 0.03
Activity index of make-up catalyst _____ 41
Catalyst density in unit, lbs./cu. ft. _____ 48.7

The catalyst temperature to the reactor at this plant was 1150° F. and the catalyst make-up rate averaged 2 tons/day. This plant was operating with all steam to the base of the seal leg and the activity of the catalyst had equilibrated at 24.6 activity index. When flue gas was used in place of steam, the activity gradually improved and equilibrated at 33.6 activity index. By varying the ratio of steam to flue gas the catalyst activity index was controllable between 24.6 and 33.6.

EXAMPLE II

In this example a TCC plant similar to the plant described in Example I was used but the catalyst temperature to the reactor was maintained at 1075° F. and the catalyst make-up rate was 0.75 tons per day average. The seal system was similar to that shown on FIGURE 3. When the seal gas in both the seal leg and top seal was changed from steam to flue gas, the equilibrium activity rose from 25.6 to 31.7.

EXAMPLE III

Another TCC plant similar to that described in Example II above was operated with a seal system as used in Example II above and as shown on FIGURE 3. The catalyst temperature to the reactor was 1150° F. and the catalyst make-up rate was 1.0 tons per day average. This plant was initially operated with essentially 100 percent flue gas in the seal leg, and with a negative differential over the catalyst valve so that the atmosphere in the top seal was essentially 100 percent steam. The catalyst activity dropped to 24.2. The pressure differential over the catalyst valve was then set at a positive value so that the atmosphere in the top seal was also essentially 100 percent flue gas. The catalyst activity rose gradually and equilibrated at 32.0. It was found possible to operate at any catalyst activity level between these limits by varying the pressure differential over the catalyst valve, thus varying the relative quantities of steam and flue gas in the top seal.

EXAMPLE IV

A TCC plant similar to that described in Example I above was used with a seal system similar to that shown on FIGURE 4. The reactor pressure was 13 p.s.i. (gauge) and the activity of the make-up catalyst was 42. This plant operated with catalyst supplied to the reactor at a temperature of about 1075° F. The catalyst make-up rate averaged 0.9 ton per day. This unit had operated with steam in the seal leg and top seal and the activity had equilibrated at 24.8. A flue gas top seal arrangement similar to that shown on FIGURE 4 was then installed and first operated so that the gas in the top seal was 100% flue gas. The catalyst activity gradually increased, lining out at 27.4.

It can be seen from the examples given above that controlling the atmosphere of the gas in both the top seal and the seal leg gives the greatest flexibility in adjusting the catalyst activities. The alternate methods shown on FIGURES 3 and 4 give less flexibility, but sufficient for control purposes. The following Table I gives the effect of increasing flue gas content in a 24,000 bbl. per day moving bed cracking unit. Only steam is supplied to the seal leg and the amount of steam supplied to the top seal is varied to obtain the desired catalyst activity index.

TABLE I

Conditions of operation of 24,000 bbl./day TCC unit as follows:
Circulation Rate, tons/hour ---------------------------- 450
Reactor Pressure, p.s.i. (gauge) ----------------------- 13
Seal Leg Temperature, °F ------------------------------ 1,075
Activity Index of Make-Up Catalyst --------------------- 42

| Percent Steam in Top Seal | Equilibrium Catalyst Activity | |
|---|---|---|
| | For .9 ton/day catalyst make-up | For 1.8 tons/day catalyst make-up |
| 100 | 24.8 | 26.8 |
| 50 | 26.6 | 28.6 |
| 18 | 27.4 | 29 |

The examples given hereinabove are only used to demonstrate the invention and are not intended as limitations of the invention. The only limitations are found in the attached claims.

I claim:

1. In a moving bed system in which a granular catalyst is gravitated as a compact stream through a reaction zone at elevated pressure and temperature and through a regeneration zone and wherein the catalyst is passed downwardly through an elongated gravity feed leg against a rising seal gas, the leg being of sufficient length to feed catalyst smoothly into the reaction zone against the advanced pressure therein, the improved method of maintaining a substantially constant catalyst activity in said reaction zone which comprises: measuring a function of catalyst activity of the catalyst in said reaction zone, supplying both steam and flue gas to the catalyst in said gravity feed leg, to seal the leg against the escape of reactants from said reaction zone, increasing the relative amount of steam to flue gas in said leg in response to an increase in the function of the catalyst activity and decreasing the relative amount of steam to flue gas in said leg in response to a decrease in the function of the catalyst activity whereby the catalyst activity is maintained substantially constant at the desired catalyst activity.

2. In a moving bed system in which a granular cracking catalyst is gravitated as a compact stream through a reaction zone at an elevated pressure of about 10–20 p.s.i. (gauge) and wherein the catalyst is passed downwardly through an elongated gravity feed leg against a rising seal gas, the leg being of sufficient lenth to feed catalyst smoothly into the top seal of a reaction zone against the advanced pressure therein, the improved method of maintaining the activity of the catalyst substantially constant between the index number 24 to 34 which comprises: measuring the catalyst activity index, supplying steam and flue gas to the seal leg and the top seal, increasing the amount of flue gas supplied to the seal leg and the top seal when the catalyst activity tends to fall below any desired level in the above range and increasing the amount of steam supplied to the seal leg and top seal when the catalyst activity tends to rise above the desired activity whereby the catalyst activity is maintained within a satisfactory operating range of activity.

References Cited by the Examiner

UNITED STATES PATENTS 2,786,800   3/1957   Myers _____ 196—132
2,951,030   8/1960   Bourguet et al. _____ 208—165

OTHER REFERENCES

"The Effects of Variables in Catalytic Cracking," Oblad et al., pp. 186 and 187, Chapter 27 in the Chemistry of Petroleum Hydrocarbons, vol. 2, Reinhold Pub. Corp., New York, 1955.

"Steam Aging of Cracking Catalysts" by H. H. Shabaker, Houdry Pioneer, May 1948, vol. 3, No. 1, pages 1 to 8.

DELBERT E. GANTZ, *Primary Examiner.*

ALPHONSO D. SULLIVAN, *Examiner.*

A. RIMENS, *Assistant Examiner.*